(12) United States Patent
Shkel et al.

(10) Patent No.: US 12,366,656 B2
(45) Date of Patent: Jul. 22, 2025

(54) TRACKING FACIAL EXPRESSIONS USING ULTRASOUND AND MILLIMETER WAVES

(71) Applicant: Meta Platforms Technologies, LLC, Menlo Park, CA (US)

(72) Inventors: Anton Andreevich Shkel, Aliso Viejo, CA (US); Gengxi Lu, Fremont, CA (US); Doruk Senkal, Redmond, WA (US); Julio Isla Garcia, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/517,806

(22) Filed: Nov. 22, 2023

(65) Prior Publication Data

US 2024/0219562 A1    Jul. 4, 2024

Related U.S. Application Data

(60) Provisional application No. 63/478,317, filed on Jan. 3, 2023.

(51) Int. Cl.
*G01S 15/89* (2006.01)
*G06F 3/01* (2006.01)
*G06T 13/40* (2011.01)
*G06V 40/16* (2022.01)

(52) U.S. Cl.
CPC .......... *G01S 15/8993* (2013.01); *G06F 3/012* (2013.01); *G06T 13/40* (2013.01); *G06V 40/174* (2022.01)

(58) Field of Classification Search
CPC . A61B 5/6803; A61B 2090/502; G06F 3/013; G06F 3/012; G06T 2207/30201
See application file for complete search history.

(56) References Cited

U.S. PATENT DOCUMENTS

| 9,727,133 | B2 | 8/2017 | Kristensson et al. |
| 9,959,678 | B2 | 5/2018 | Katz et al. |
| 2017/0352183 | A1* | 12/2017 | Katz ..................... G06T 19/006 |
| 2017/0365101 | A1* | 12/2017 | Samec .................. G06T 19/006 |
| 2020/0090392 | A1* | 3/2020 | Chou .................... G06V 40/174 |
| 2020/0159043 | A1 | 5/2020 | Langford et al. |
| 2020/0188629 | A1* | 6/2020 | Levenberg ........... A61N 1/3603 |
| 2021/0014473 | A1* | 1/2021 | Hua ................... G02B 27/0172 |
| 2021/0183343 | A1* | 6/2021 | Beith ....................... G09G 5/38 |
| 2022/0011855 | A1 | 1/2022 | Hazra et al. |

OTHER PUBLICATIONS

Xu Y., et al., "Multi Sensors Based Ultrasonic Human Face Identification: Experiment and Analysis," 2012 IEEE International Conference on Multisensor Fusion and Integration for Intelligent Systems (MFI), Sep. 13-15, 2012, pp. 257-261.

* cited by examiner

*Primary Examiner* — Gerald Johnson
(74) *Attorney, Agent, or Firm* — Freestone Intellectual Property Law PLLC; Aaron J. Visbeek

(57) ABSTRACT

A headset includes a frame and a plurality of transducers positioned on the frame to transmit beams towards one or more portions of a face of a user of the headset. The plurality of transducers receive reflected beams from the one or more portions of the face and generate sensor data that varies in response to the received reflected beams. The headset also includes a controller configured to use a machine learning model to generate an estimate of an expression of the user using the sensor data.

20 Claims, 10 Drawing Sheets

900 transmitting beams, by a plurality of transducers positioned on a frame of a headset, towards one or more portions of a face of a user of the headset
910 receiving reflected beams from the one or more portions of the face at the plurality of transducers
920 producing, by the plurality of transducers, sensor data that varies in response to the received reflected beams
930 applying, by a controller, the sensor data to a machine learning model that generates, using the sensor data, an estimate of an expression of the user
940

FIG. 9

TRACKING FACIAL EXPRESSIONS USING ULTRASOUND AND MILLIMETER WAVES

CROSS-REFERENCE TO RELATED APPLICATIONS

This application claims the benefit of U.S. Provisional Application No. 63/478,317, filed Jan. 3, 2023, which is incorporated by reference.

FIELD OF THE INVENTION

This disclosure relates generally to artificial reality systems, and more specifically to head-mounted face tracking using ultrasound and/or millimeter waves for artificial reality systems.

BACKGROUND

Head mounted face tracking is conventionally done using cameras. But cameras can have relatively high-power and data throughput budgets, which is not ideal for form factors which have limited power and compute budgets (e.g., headsets). Moreover, orientation of cameras for face tracking can result in issues with occlusion caused by, e.g., facial hair of the user, or improper line of sight.

SUMMARY

Through ultrasound sensing to track facial expressions, a headset may capture more data than is available by camera alone. Ultrasound sensing directed to specific portions of the face can allow for greater accuracy in depth information at a lower power consumption, with a small physical footprint. Further, ultrasound sensing is less impacted by ambient environmental conditions that interfere with other sensors such as cameras. For example, ultrasound can penetrate facial hair and so can track the movement of a lower face with facial hair more efficiently than a camera. By directing transducers in the headset to the user's face to track the motion of the face, the headset can capture a richer data set relating to the user at a lower cost (e.g., lower power usage) and with a smaller footprint than is typically achieved using conventional approaches.

In one embodiment, the headset includes: a frame with transducers positioned on the frame to transmit beams towards one or more portions of a face of a user of the headset. At least some of the transducers receive reflected beams from the one or more portions of the face. These transducers generate signals that vary in response to process the received reflected beams. Additionally or alternatively, separate sensors may be used to generate signals that vary in response to the received reflected beams. The headset also includes a controller configured to receive sensor data describing the signals generated by the transducers and/or other sensors and apply the sensor data to a machine learning model that generates an estimate of an expression of the user.

BRIEF DESCRIPTION OF THE DRAWINGS

FIG. 9 is a flowchart illustrating a process for tracking facial expression using ultrasound and millimeter waves, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

An artificial reality headset comprises a depth sensing system configured to use ultrasound to perform face tracking of a user of the headset. In some embodiments, the headset may be a head-mounted display. In other embodiments, the headset is a pair of smart glasses that have an eyeglasses-shaped form factor. The depth sensing system includes transducers (e.g., ultrasound transducers, millimeter wave transducers) and a controller. The transducers are positioned on a frame of the headset to transmit beams towards one or more portions of a face of a user of the headset, and to receive reflected beams from the one or more portions of the face. A controller estimates distances and orientations of the one or more portions of the face based on the signals generated by the transducers in response to the reflected beams using a machine learned model. An avatar associated with the user may be updated to have the estimated expression.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

Figure 1A:
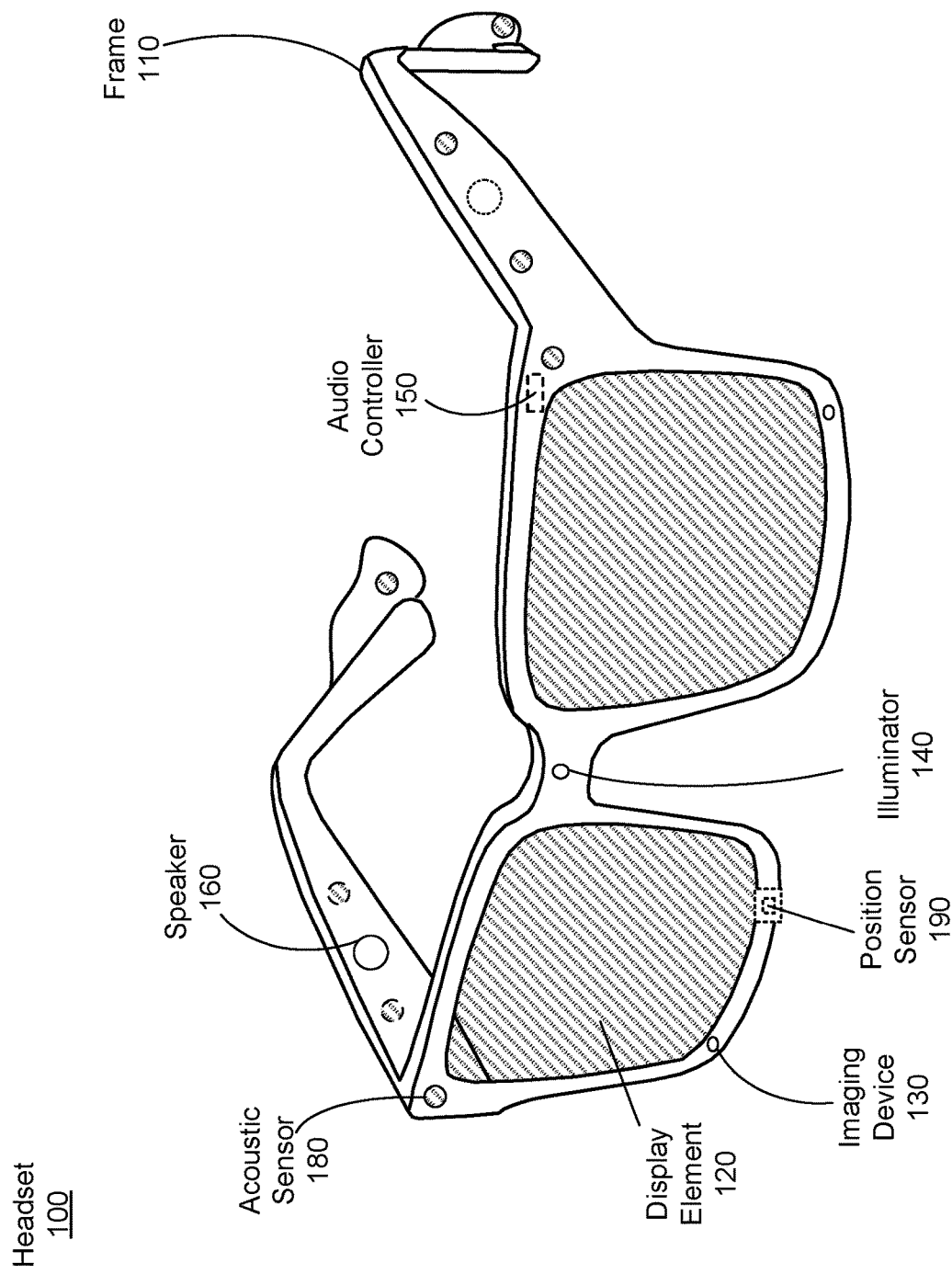
FIG. 1A is a perspective view of a headset implemented as an eyewear device, in accordance with one or more embodiments.

FIG. 1A is a perspective view of a headset 100 implemented as an eyewear device, in accordance with one or more embodiments. In some embodiments, the eyewear device is a near eye display (NED). In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame, and may include, among other components, a display assembly including one or more display elements 120, a depth camera assembly (DCA), an audio system, and a position sensor 190. While FIG. 1A illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1A.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, ear piece).

The one or more display elements 120 provide light to a user wearing the headset 100. As illustrated the headset includes a display element 120 for each eye of a user. In some embodiments, a display element 120 generates image light that is provided to an eyebox of the headset 100. The eyebox is a location in space that an eye of user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eyebox. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

In some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

The DCA determines depth information for a portion of a local area surrounding the headset 100. The DCA includes one or more imaging devices 130 and a DCA controller (not shown in FIG. 1A), and may also include an illuminator 140. In some embodiments, the illuminator 140 illuminates a portion of the local area with light. The light may be, e.g., structured light (e.g., dot pattern, bars, etc.) in the infrared (IR), IR flash for time-of-flight, etc. In some embodiments, the one or more imaging devices 130 capture images of the portion of the local area that include the light from the illuminator 140. As illustrated, FIG. 1A shows a single illuminator 140 and two imaging devices 130. In alternate embodiments, there is no illuminator 140 and at least two imaging devices 130.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 140), some other technique to determine depth of a scene, or some combination thereof.

The DCA may include an eye tracking unit that determines eye tracking information. The eye tracking information may comprise information about a position and an orientation of one or both eyes (within their respective eye-boxes). The eye tracking unit may include one or more cameras. The eye tracking unit estimates an angular orientation of one or both eyes based on images captures of one or both eyes by the one or more cameras. In some embodiments, the eye tracking unit may also include one or more illuminators that illuminate one or both eyes with an illumination pattern (e.g., structured light, glints, etc.). The eye tracking unit may use the illumination pattern in the captured images to determine the eye tracking information. The headset 100 may prompt the user to opt in to allow operation of the eye tracking unit. For example, by opting in the headset 100 may detect, store, images of the user's any or eye tracking information of the user.

The audio system provides audio content and other sound such as the ultrasounds and millimeter waves used in facial tracking. The audio system includes a transducer array, a sensor array, and an audio controller 150. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The transducer array includes both transducers which present sound to user as well as transducers which provide ultrasound and millimeter waves for facial tracking. A transducer for presenting sound to the user may be a speaker 160. Although the speakers 160 are shown exterior to the frame 110, the speakers 160 may be enclosed in the frame 110. In some embodiments, instead of individual speakers for each ear, the headset 100 includes a speaker array comprising multiple speakers integrated into the frame 110 to improve directionality of presented audio content. The number and/or locations of transducers may be different from what is shown in FIG. 1A. The transducer array also provides sound for the use in face tracking by directing ultrasound and/or millimeter waves to portions of the user's face. Additional details regarding the transducer array for use in facial expression tracking are discussed below in connection with FIGS. 2 and 5-8.

In some embodiments, the transducer array both transmits and receives the ultrasound and millimeter waves. In other embodiments, a portion of the transducer array transmits the ultrasound and/or millimeter waves, and a second portion of the transducer array receives the reflected beams. For further discussion of the distinctions between transducers to be used in facial expression tracking, see FIGS. 4 and 5 below.

The sensor array detects sounds within the local area of the headset 100. The sensor array includes acoustic sensors 180. An acoustic sensor 180 captures sounds emitted from one or more sound sources in the local area (e.g., a room). Each acoustic sensor is configured to detect sound and convert the detected sound into an electronic format (analog or digital). The acoustic sensors 180 may be acoustic wave sensors, microphones, sound transducers, or similar sensors that are suitable for detecting sounds. The sensor array also captures the reflected ultrasound and/or millimeter waves used in face tracking as the beams reflect off of the user's face and converts the captured sound into an electronic format. Additional details regarding the sensor array and the use of the captured sound once converted into electronic format are discussed below in connection with FIGS. 5-8.

In some embodiments, one or more acoustic sensors 180 may be placed in an ear canal of each ear (e.g., acting as binaural microphones). In some embodiments, the acoustic sensors 180 may be placed on an exterior surface of the headset 100, placed on an interior surface of the headset 100, separate from the headset 100 (e.g., part of some other device), or some combination thereof. The number and/or locations of acoustic sensors 180 may be different from what is shown in FIG. 1A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 100.

The audio controller 150 processes information from the sensor array that describes sounds detected by the sensor array. The audio controller 150 may comprise a processor and a computer-readable storage medium. The audio controller 150 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 160, or some combination thereof. The audio controller 150 processes the captured sound from the sensor array reflected off of the user's face and analyzes the captured data to determine the facial expressions of the user. Additional details regarding the audio controller 150 are discussed below in connection with FIG. 4, especially the controller 430.

The position sensor 190 generates one or more measurement signals in response to motion of the headset 100. The position sensor 190 may be located on a portion of the frame 110 of the headset 100. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the imaging devices 130 of the DCA may also function as the PCA. The images captured by the PCA and the depth information determined by the DCA may be used to determine parameters of the local area, generate a model of the local area, update a model of the local area, or some combination thereof. Furthermore, the position sensor 190 tracks the position (e.g., location and pose) of the headset 100 within the room. Additional details regarding the components of the headset 100 are discussed below in connection with FIGS. 2 and 3.

Figure 1B:
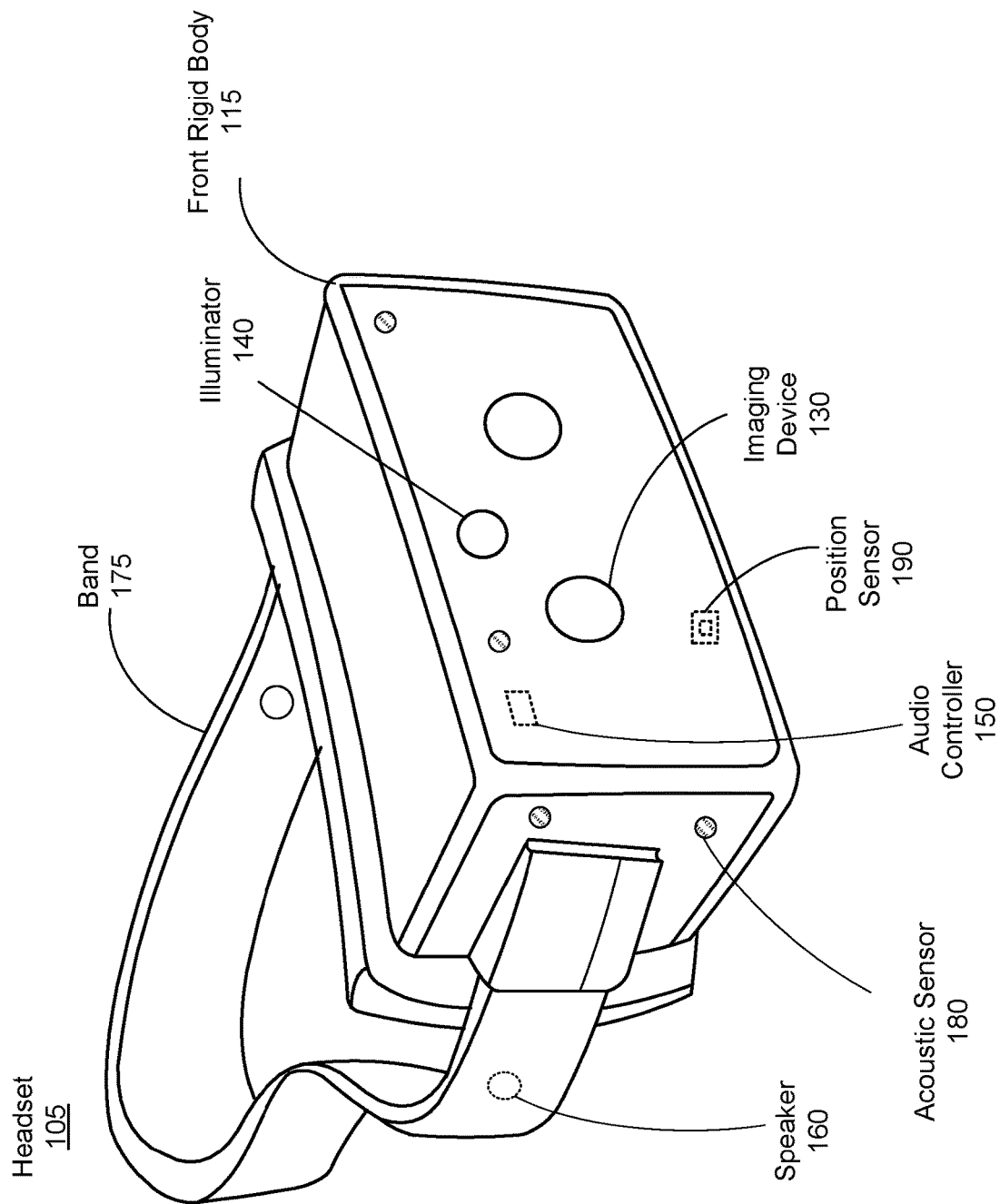
FIG. 1B is a perspective view of a headset implemented as a head-mounted display, in accordance with one or more embodiments.

FIG. 1B is a perspective view of a headset 105 implemented as a head mounted device (HMD), in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 115 and a band 175. The headset 105 includes many of the same components described above with reference to FIG. 1A, but modified to integrate with the HMD form factor. For example, the HMD includes a display assembly, a DCA, an audio system, and a position sensor 190. FIG. 1B shows the illuminator 140, the speakers 160, the imaging devices 130, acoustic sensors 180, and the position sensor 190. The speakers 160 may be located in various locations, such as coupled to the band 175 (as shown), coupled to front rigid body 115, or may be configured to be inserted within the ear canal of a user.

Figure 2:
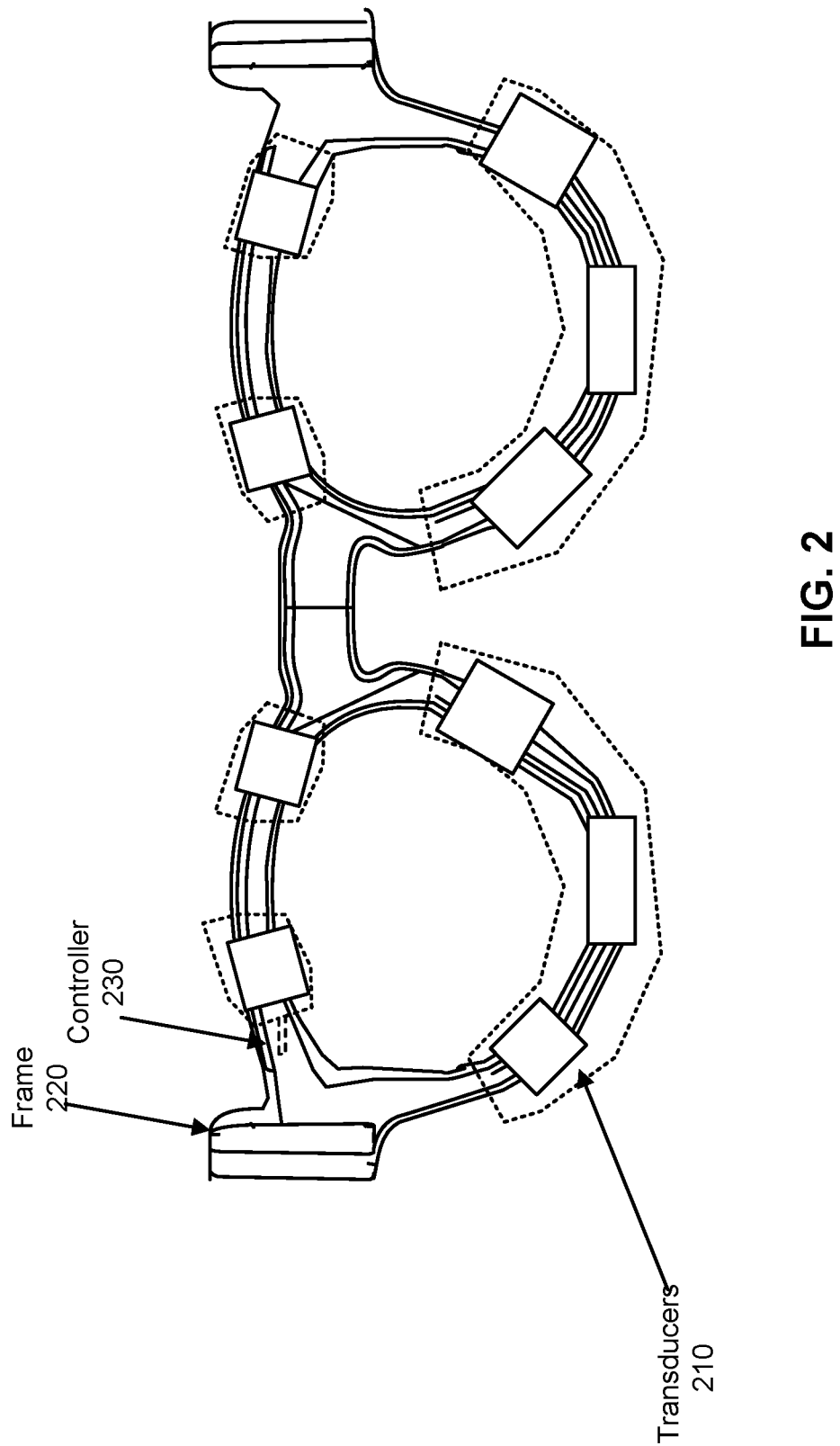
FIG. 2 is a rear view of a headset implemented as a head-mounted display with transducers for expression tracking, in accordance with one or more embodiments.

FIG. 2 is a rear view of a headset 200 implemented as a head-mounted display with transducers for expression tracking, in accordance with one or more embodiments. In some embodiments, the headset 200 may be the headset 100 of FIG. 1A or the headset 105 of FIG. 1B. The headset 200 includes a transducers 210 along the frame 220, directed at various portions of the user s face when worn. A transducers 210 may be positioned on the headset 200 (e.g., on a frame 220 of the headset 200) to facilitate facial tracking. For example, the transducers 210 may have transducers positioned to track a right brow region of the user, a left brow region of the user, a mouth of the user, a jaw region of the user, one or both cheeks of the user, a nose of the user, some other portion of a face of the user, or some combination thereof. In some embodiments, a camera (not shown) is positioned to capture images of portions of the face of the user of the headset, to provide data with high lateral resolution. In some embodiments, the transducers 210 are positioned to track another body part of the user such as shoulders or upper torso and so track the movement of the head relative to that other body part and estimate head movement.

The transducers 210 may be ultrasonic transducers, millimeter wave transducers, or a combination of both. The transducers 210 generate waves, which may form beams, that are incident on the user and reflected. The transducers 210 may also receive reflected beams and generate sensor data that varies in response to the reflected beams (e.g., the sensor data may be time-series of numerical values describing the wave functions of reflected beams incident on the transducers 220). In some embodiments, the transducer array both transmits and receives the ultrasound and millimeter waves. In other embodiments, a portion of the transducer array transmits the ultrasound and/or millimeter waves, and a second portion of the transducer array receives the reflected beams. For further discussion, see FIG. 5 below. The headset 220 may alternatively or additionally include sensors, such as the second portion of the transducer array, distinct from the transducers 210 which generate sensor data describing received reflected beams in a similar manner to the transducers 220 (as discussed further in FIG. 5). The headset may also include a controller 230 configured to apply the sensor data to a machine learning model that maps different reflected beams to corresponding expressions to estimate an expression of the user. The transducers can operate in both pulse-echo and pitch-catch modes, as discussed further in FIG. 5.

In one embodiment, the transducers 210 are configured to transmit beams towards one or more portions of a face of a user of the headset 200, and to receive reflected beams from the one or more portions of the face. Note reflection as used herein may also include diffracted and/or scattered beams. As such, the reflected beam can contain depth information that would otherwise be occluded in traditional line of sight methodologies (i.e., cameras).

The transducers 210 may include one or more transducer chips, where each chip includes a group of transducers. The transducers 210 may include one or more groups of transducers that can each operate as a phased array. A transducer 210 may be, e.g., a Piezoelectric Micromachined Ultrasonic Transducer (PMUT), which is a MEMS-based piezoelectric ultrasonic transducer, or a Capacitive Micromachined Ultrasonic Transducer (CMUT). Each transducer may have a small size (e.g., 100-1000 microns), which allows many ultrasound transducers to be located on the frame and/or in a chip. An ultrasound transducer 210 may be configured to emit ultrasound waves with a center frequency between approximately 100 kHz-2 Mhz. For example, a center frequency of an ultrasound transducer 210 may be 300 kHz. In some embodiments, the transducers 210 transmit signals having a single frequency or within a narrowband spectrum of ultrasound radiation. One or more of the transducers may emit within a same frequency band, but modulated orthogonal to each other. In some embodiments, the transducers 210 transmit multiple narrow band frequencies. The transducers 210 may have different center frequencies within the range of 20 kHz to 2 MHz.

In one embodiment, the locations of each of the transducers 210 is distributed on the headset 200 to optimize the predicted accuracy. Each of the transducers has a range at which it obtains an amplitude measurement and is directed to an associated portion of the face of the user, such that the range of each transducer is used to determine the expressions of the user based on the movement of the associated portion of the face of the user. The amplitude measurement measures movement of the associated portion of the face of the user and so provides indicators related to various facial expressions based on the measured movement of each measured portion of the face.

Figure 3:
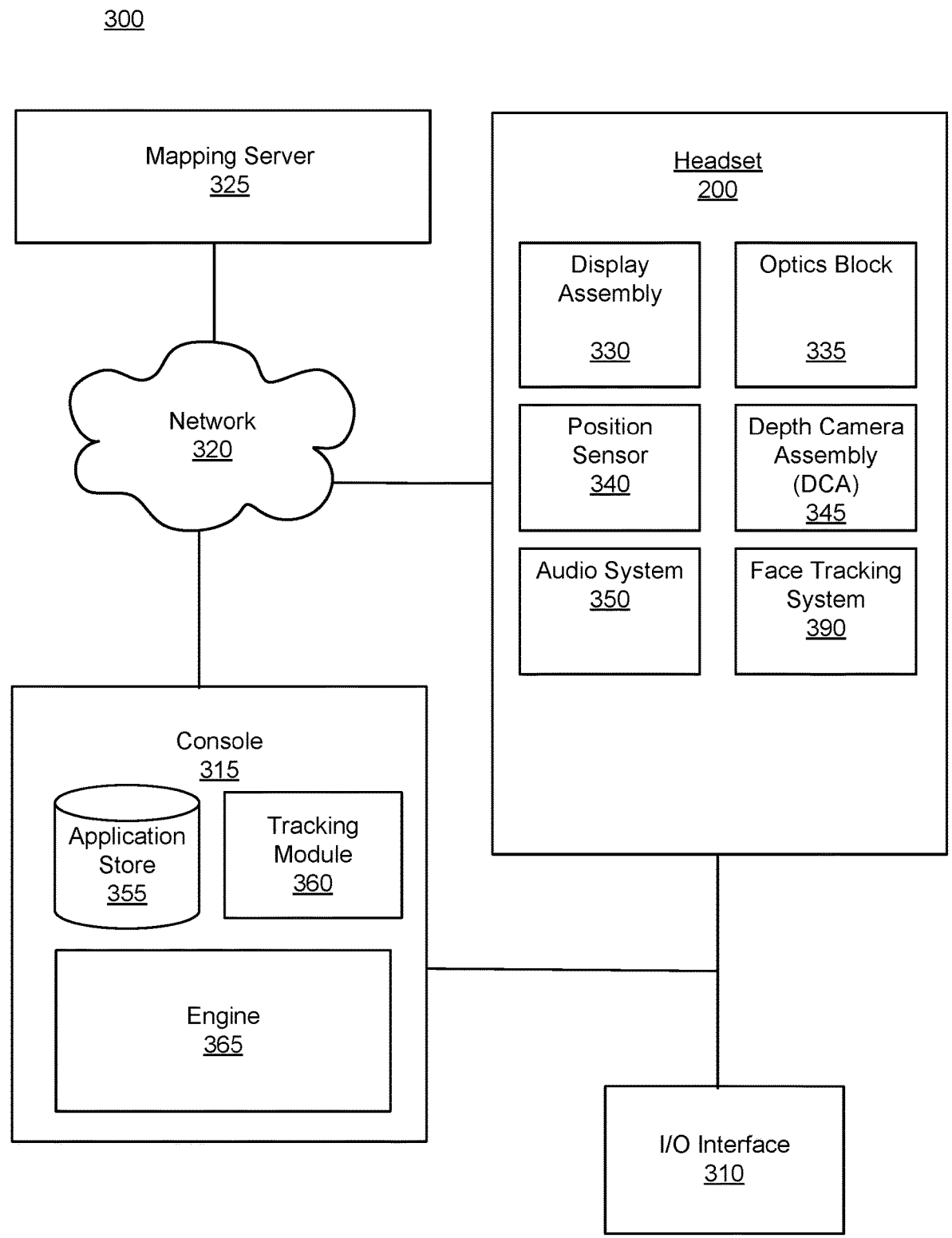
FIG. 3 is a system that includes a headset, in accordance with one or more embodiments.

FIG. 3 shows a system 300 that includes a headset 300, in accordance with one or more embodiments. The headset 300 may be the headset 200 of FIG. 2, the headset 100 of FIG. 1A, or the headset 105 of FIG. 1B, etc. The system 300 may operate in an artificial reality environment (e.g., a virtual reality environment, an augmented reality environment, a mixed reality environment, or some combination thereof). The system 300 shown by FIG. 3 includes the headset 300, an input/output (I/O) interface 310 that is coupled to a console 315, the network 320, and the mapping server 325. While FIG. 3 shows an example system 300 including one headset 300 and one I/O interface 310, in other embodiments any number of these components may be included in the system 300. For example, there may be multiple headsets each having an associated I/O interface 310, with each headset and I/O interface 310 communicating with the console 315. In alternative configurations, different and/or additional components may be included in the system 300. Additionally, functionality described in conjunction with one or more of the components shown in FIG. 3 may be distributed among the components in a different manner than described in conjunction with FIG. 3 in some embodiments. For example, some or all of the functionality of the console 315 may be provided by the headset 300.

The headset 300 includes the display assembly 330, an optics block 335, one or more position sensors 340, and the DCA 345. Some embodiments of headset 300 have different components than those described in conjunction with FIG. 3. Additionally, the functionality provided by various components described in conjunction with FIG. 3 may be differently distributed among the components of the headset 300 in other embodiments, or be captured in separate assemblies remote from the headset 300.

The display assembly 330 displays content to the user in accordance with data received from the console 315. The display assembly 330 displays the content using one or more display elements (e.g., the display elements 120). A display element may be, e.g., an electronic display. In various embodiments, the display assembly 330 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 120 may also include some or all of the functionality of the optics block 335.

The optics block 335 may magnify image light received from the electronic display, corrects optical errors associated with the image light, and presents the corrected image light to one or both eyeboxes of the headset 300. In various embodiments, the optics block 335 includes one or more optical elements. Example optical elements included in the optics block 335 include: an aperture, a Fresnel lens, a convex lens, a concave lens, a filter, a reflecting surface, or any other suitable optical element that affects image light. Moreover, the optics block 335 may include combinations of different optical elements. In some embodiments, one or more of the optical elements in the optics block 335 may have one or more coatings, such as partially reflective or anti-reflective coatings.

Magnification and focusing of the image light by the optics block 335 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 335 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 335 corrects the distortion when it receives image light from the electronic display generated based on the content.

The position sensor 340 is an electronic device that generates data indicating a position of the headset 300. The position sensor 340 generates one or more measurement signals in response to motion of the headset 300. The position sensor 190 is an embodiment of the position sensor 340. Examples of a position sensor 340 include: one or more IMUs, one or more accelerometers, one or more gyroscopes, one or more magnetometers, another suitable type of sensor that detects motion, or some combination thereof. The position sensor 340 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 300 from the sampled data. For example, the IMU integrates the measurement signals received from the accelerometers over time to estimate a velocity vector and integrates the velocity vector over time to determine an estimated position of a reference point on the headset 300. The reference point is a point that may be used to describe the position of the headset 300. While the reference point may generally be defined as a point in space, however, in practice the reference point is defined as a point within the headset 300.

The DCA 345 generates depth information for a portion of the local area. The DCA includes one or more imaging devices and a DCA controller. The DCA 345 may also include an illuminator. Operation and structure of the DCA 345 is described above with regard to FIG. 1A.

The audio system 350 provides audio content to a user of the headset 300. The audio system 350 may comprise one or acoustic sensors, one or more transducers, and an audio controller. The audio system 350 may provide spatialized audio content to the user. In some embodiments, the audio system 350 may request acoustic parameters from the mapping server 325 over the network 320. The acoustic parameters describe one or more acoustic properties (e.g., room impulse response, a reverberation time, a reverberation level, etc.) of the local area. The audio system 350 may provide information describing at least a portion of the local area from e.g., the DCA 345 and/or location information for the headset 300 from the position sensor 340. The audio system 350 may generate one or more sound filters using one or more of the acoustic parameters received from the mapping server 325, and use the sound filters to provide audio content to the user.

The face tracking module 390 provides the ultrasound and/or millimeter waves used for the tracking of facial expressions. The face tracking module 390 receives the reflected beams through the sensors and processes the reflected beams into data using the audio controller. The operation and structure of the face tracking module 390, including the transducers, sensors and the controller, is described below in regards to FIG. 4.

The I/O interface 310 is a device that allows a user to send action requests and receive responses from the console 315. An action request is a request to perform a particular action. For example, an action request may be an instruction to start or end capture of image or video data, or an instruction to perform a particular action within an application. The I/O interface 310 may include one or more input devices. Example input devices include: a keyboard, a mouse, a game controller, or any other suitable device for receiving action requests and communicating the action requests to the console 315. An action request received by the I/O interface 310 is communicated to the console 315, which performs an action corresponding to the action request. In some embodiments, the I/O interface 310 includes an IMU that captures calibration data indicating an estimated position of the I/O interface 310 relative to an initial position of the I/O interface 310. In some embodiments, the I/O interface 310 may provide haptic feedback to the user in accordance with instructions received from the console 315. For example, haptic feedback is provided when an action request is received, or the console 315 communicates instructions to the I/O interface 310 causing the I/O interface 310 to generate haptic feedback when the console 315 performs an action.

The console 315 provides content to the headset 300 for processing in accordance with information received from one or more of: the DCA 345, the headset 300, and the I/O interface 310. In the example shown in FIG. 3, the console 315 includes an application store 355, a tracking module 360, and an engine 365. Some embodiments of the console 315 have different modules or components than those described in conjunction with FIG. 3. Similarly, the functions further described below may be distributed among components of the console 315 in a different manner than described in conjunction with FIG. 3. In some embodiments, the functionality discussed herein with respect to the console 315 may be implemented in the headset 300, or a remote system.

The application store 355 stores one or more applications for execution by the console 315. An application is a group of instructions, that when executed by a processor, generates content for presentation to the user. Content generated by an application may be in response to inputs received from the user via movement of the headset 300 or the I/O interface 310. Examples of applications include: gaming applications, conferencing applications, video playback applications, or other suitable applications.

The tracking module 360 tracks movements of the headset 300 or of the I/O interface 310 using information from the DCA 345, the one or more position sensors 340, or some combination thereof. For example, the tracking module 360 determines a position of a reference point of the headset 300 in a mapping of a local area based on information from the headset 300. The tracking module 360 may also determine positions of an object or virtual object. Additionally, in some embodiments, the tracking module 360 may use portions of data indicating a position of the headset 300 from the position sensor 340 as well as representations of the local area from the DCA 345 to predict a future location of the headset 300. The tracking module 360 provides the estimated or predicted future position of the headset 300 or the I/O interface 310 to the engine 365.

The engine 365 executes applications and receives position information, acceleration information, velocity information, predicted future positions, or some combination thereof, of the headset 300 from the tracking module 360. Based on the received information, the engine 365 determines content to provide to the headset 300 for presentation to the user. For example, if the received information indicates that the user has looked to the left, the engine 365 generates content for the headset 300 that mirrors the user's movement in a virtual local area or in a local area augmenting the local area with additional content. Additionally, the engine 365 performs an action within an application executing on the console 315 in response to an action request received from the I/O interface 310 and provides feedback to the user that the action was performed. The provided feedback may be visual or audible feedback via the headset 300 or haptic feedback via the I/O interface 310.

The network 320 couples the headset 300 and/or the console 315 to the mapping server 325. The network 320 may include any combination of local area and/or wide area networks using both wireless and/or wired communication systems. For example, the network 320 may include the Internet, as well as mobile telephone networks. In one embodiment, the network 320 uses standard communications technologies and/or protocols. Hence, the network 320 may include links using technologies such as Ethernet, 902.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 320 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 320 can be represented using technologies and/or formats including image data in binary form (e.g., Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The mapping server 325 may include a database that stores a virtual model describing spaces, in which one location in the virtual model corresponds to a current configuration of a local area of the headset 300. The mapping server 325 receives, from the headset 300 via the network 320, information describing at least a portion of the local area and/or location information for the local area. The user may adjust privacy settings to allow or prevent the headset 300 from transmitting information to the mapping server 325. The mapping server 325 determines, based on the received information and/or location information, a location in the virtual model that is associated with the local area of the headset 300. The mapping server 325 determines (e.g., retrieves) one or more acoustic parameters associated with the local area, based in part on the determined location in the virtual model and any acoustic parameters associated with the determined location. The mapping server 325 may transmit the location of the local area and any values of acoustic parameters associated with the local area to the headset 300.

One or more components of system 300 may contain a privacy module that stores one or more privacy settings for user data elements. The user data elements describe the user or the headset 300. For example, the user data elements may describe a physical characteristic of the user, an action performed by the user, a location of the user of the headset 300, a location of the headset 300, an HRTF for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 300 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

Figure 4:
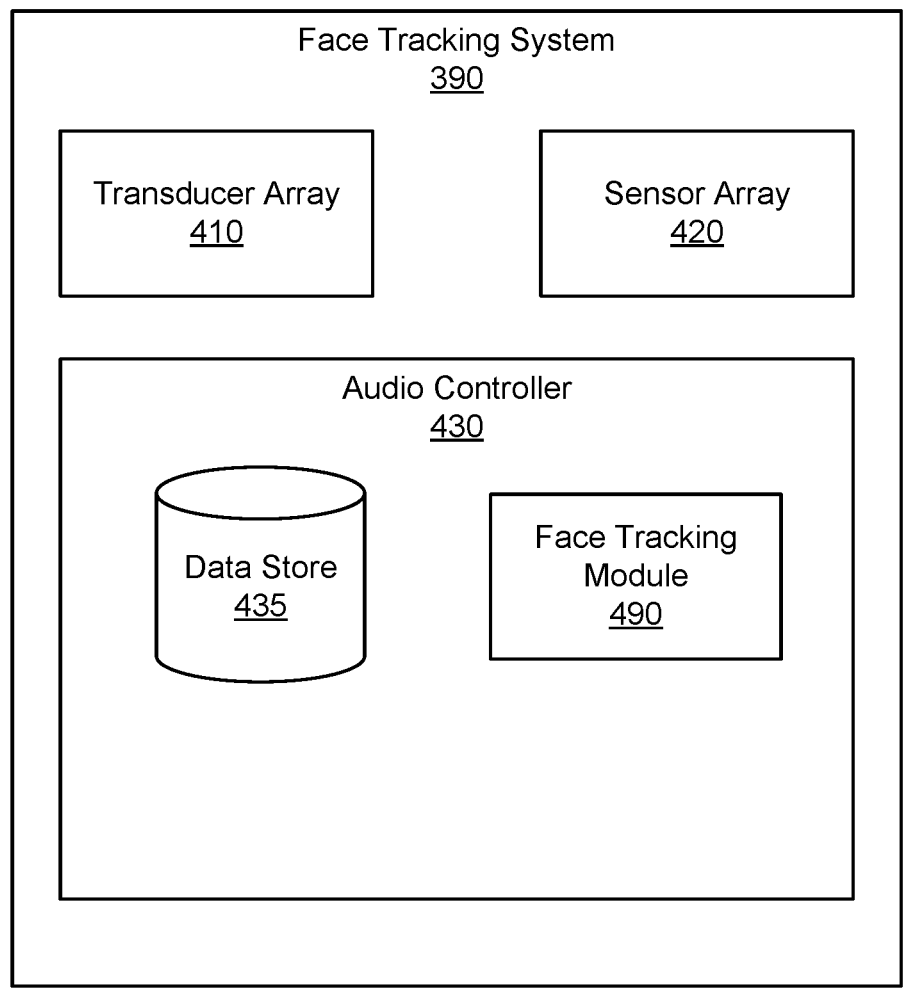
FIG. 4 is a block diagram of an audio system, in accordance with one or more embodiments.

FIG. 4 is a block diagram of a face tracking system 390, in accordance with one or more embodiments. The face tracking system 390 generates sound to be used as part of the tracking of facial expressions. In the embodiment of FIG. 4, the face tracking system 390 includes a transducer array 410, a sensor array 420, and a controller 430. Some embodiments of the face tracking system 390 have different components than those described here. Similarly, in some cases, functions can be distributed among the components in a different manner than is described here.

The transducer array 410 is configured to send out ultrasound and millimeter waves for facial tracking. The transducer array 410 includes transducers, and may include transducers 210 as described in FIG. 2. 2The transducer array 410 generates ultrasound waves and/or millimeter waves in accordance with instructions from the controller 430. The controller 430 may be controller 230 as described in FIG. 2. The transducer array 410 may be coupled to a wearable device (e.g., the headset 100 or the headset 105). In alternate embodiments, the transducer array 410 may be separate from the wearable device (e.g., coupled to an external console or mounted on a boom or feature that extends away from the wearable device).

In some embodiments, the transducer array 410 detects the reflected beams and converts the detected reflected beam into an electronic format (analog or digital). In other embodiments, the sensor array 420 detects the reflected beams and converts the reflected beams into the electronic format. The transducer array 410 and/or sensor array 420 are configured to monitor the ultrasound and/or millimeter waves generated by the transducer array 410 in order to capture the reflected beams aimed at different portions of the user's face. Increasing the number of sensors may improve the accuracy of information (e.g., directionality) describing a sound field produced by the transducer array 410.

The controller 430 controls operation of the face tracking system 390. In the embodiment of FIG. 4, the controller 430 includes a data store 435, and a face tracking module 490. The controller 430 may be located inside a headset, in some embodiments. Some embodiments of the controller 430 have different components than those described here. Similarly, functions can be distributed among the components in different manners than described here. For example, some functions of the controller may be performed external to the headset. The user may opt in to allow the controller 430 to transmit data captured by the headset to systems external to the headset, and the user may select privacy settings controlling access to any such data.

The data store 435 stores data for use by the face tracking system 390. In some embodiments, the data store 435 includes a virtual model of the user's face and previous facial expressions in order to customize the face tracking to the specific user. The user may opt-in to allow the data store 435 to record data captured by the face tracking system 390. In some embodiments, the face tracking system 390 may employ always on recording, in which the face tracking system 390 records all sounds captured by the face tracking system 390 in order to improve the experience for the user. The user may opt in or opt out to allow or prevent the face tracking system 390 from recording, storing, or transmitting the recorded data to other entities.

The face tracking module 490 tracks the facial expressions of the user of the headset 300 based on the information from the sensor array 420 as well as, in some embodiments, the DCA 345. The face tracking module 490 provides the data from the received reflected beams to a facial expressions model configured to estimate an expression of the user.

The face tracking module 490 may also include an avatar machine learning model with a vector of values each representing a distinct degree of freedom of the user's movement. The vector is what represents the user's orientation and expression. The avatar machine learning model has two outputs: the position of each vertex which makes up the subject's mesh, and a texture map representing the color for each part of the mesh. The mesh is what is used to generate an image of the user in Augmented Reality or Virtual Reality spaces. The facial model of the face tracking module 490 receives an input the captured data from the headset and outputs the vector for the avatar, such that an avatar machine learning model may use the vector to output a mesh.

The facial expressions model may be machine learned model. The facial expressions model may be a model K nearest neighbors (KNN) model, a Support Vector Machine (SVM), a convolutional neural network (CNN), etc. The model maps different reflected beams (e.g., depth and amplitude information describing portions of a user's face) to corresponding expressions. The model may be trained using multiple training users making specific expressions while using the depth sensing system. In this manner, the model may determine an expression of a user using signals from the transducers and the model. The determined expression may be used to, e.g., render the expression on a corresponding avatar of the user in an artificial reality environment. Moreover, in some embodiments, the model may also map specific expressions of the face to specific emotions (e.g., anger, contempt, disgust, fear, sadness, happiness, etc.). In some embodiments, the face tracking module 490 renders an avatar of the user to express the determined emotions in an artificial reality environment. In other embodiments, the face tracking module 490 provides the facial expression information to other components in the network 320 such as the console 315 for further uses, such as to customize the content to the user, or as feedback in an application.

The specific facial expressions tracked may depend on the machine learning model and the training set used. In some embodiments, the Facial Action Coding System, as a taxonomy of human facial movements by appearance on the face, is used to categorize facial expressions. For example, some facial expressions that may be tracked include: 'angry', 'check puffed', 'cheek raised', 'chin raiser', 'closed mouth smile', 'contempt', 'dimpler no smile', 'disgust', 'eyebrow lowered', 'eyebrow raised', 'eyes closed', 'fear', 'funneler', 'happy', 'jaw forward', 'jaw left', 'jaw right', 'jaw stretch gentle', 'lip corner lowered', 'lip tigtener', 'lower bottom lip', 'mouth left', 'mouth right', 'neutral', 'nose wrinkle', 'pucker lips', 'sad', and 'upper lip raiser'. The face tracking module 490 may also capture and detect head movement of the user relative to the body.

Figure 5:
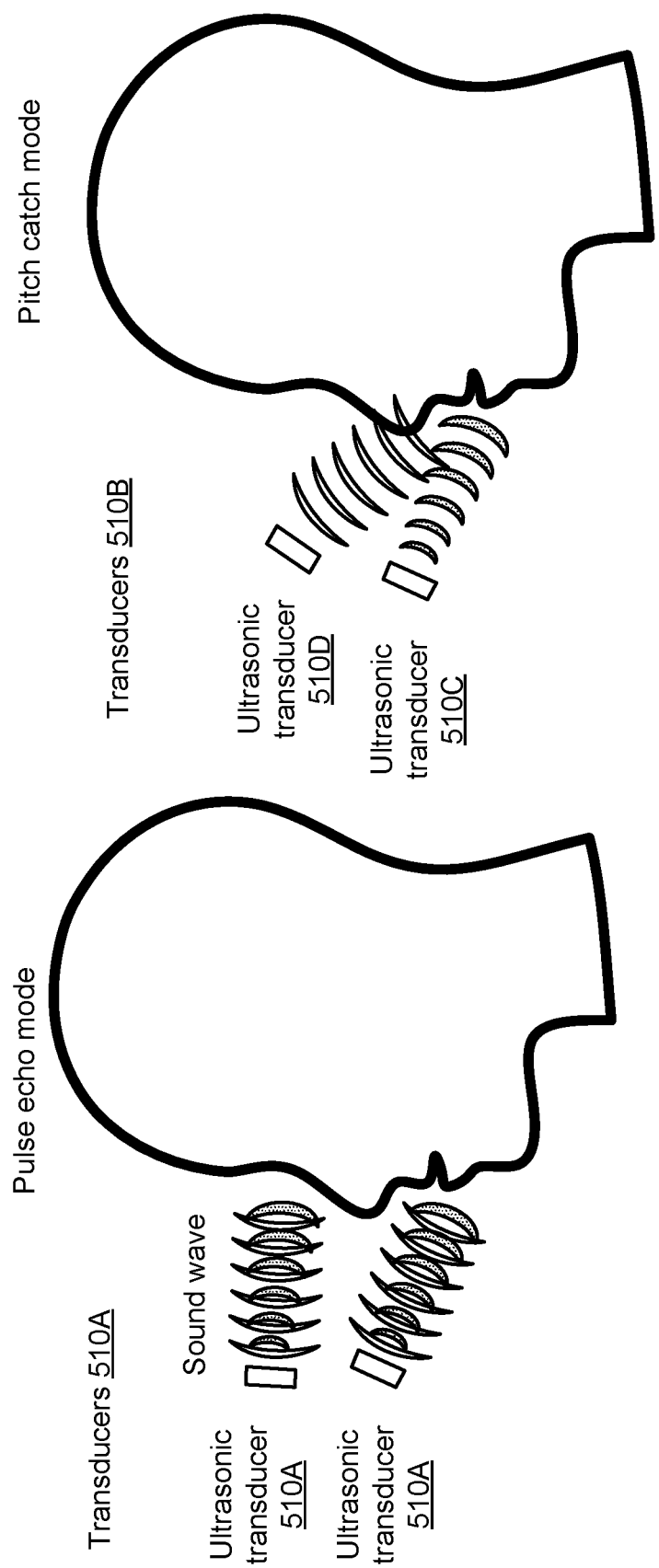
FIG. 5 illustrates two modes in which the transducers capture information about the facial expression of a user, in accordance with some embodiments.

FIG. 5 illustrates two modes in which the transducers 510 capture information about the facial expression of a user, in accordance with some embodiments. These merely represent two potential embodiments for the transducers and should not be taken in a way to limit any other embodiments. The transducers 510 may be the transducers 210 as shown in FIG. 2, or the transducers array 410 as shown in FIG. 4.

The transducers 510 may be configured to operate in a particular mode—such as either pulse echo or pitch catch. In some embodiments, a transducer 510 may transmit a beam and also receive a beam, this is referred to as pulse echo mode, as seen in ultrasonic transducers 510A and 510B. In this embodiment, the transducers, such as transducer array 410 may both transmit and receive the ultrasound and/or millimeter waves. In other embodiments, a transmitter transducer (Tx) 510C may only transmit a beam, and a separate receiver transducer (Rx) 510D is configured to only receive a beam from one or more Txs 510C (as reflected from the face)—this is referred to pitch catch mode. In this embodiment, the transducers are divided between a transducer array 410, with the Tx 510C, and the sensor array 420, with the Rx 510D. A number of Rx 510D and a number of Tx 510C may be the same or different from each other. For example, in some embodiments, there may be six Txs 510C on the headset (e.g., one for each eyebrow, one for a middle of the forehead, one for the nose, and two for the lower face), and thirty Rxs 510D distributed across the frame to capture beams reflected from the different portions of the face of the user.

Figure 6:
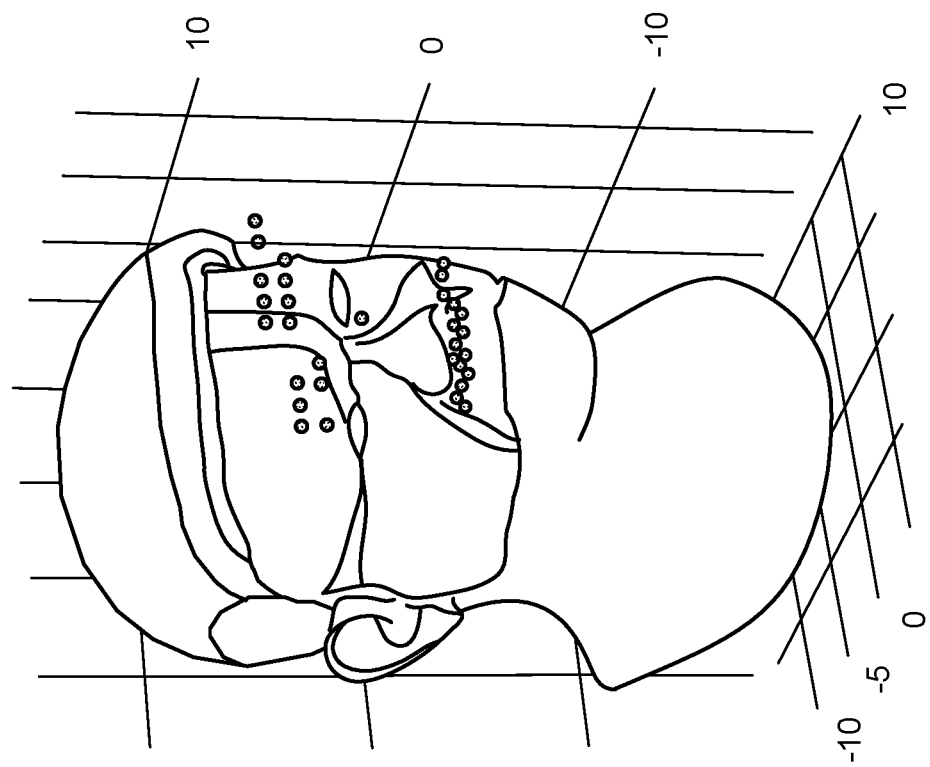
FIG. 6 illustrates some example locations on a face of a user that may be tracked, according to some embodiments.
Figure 6:
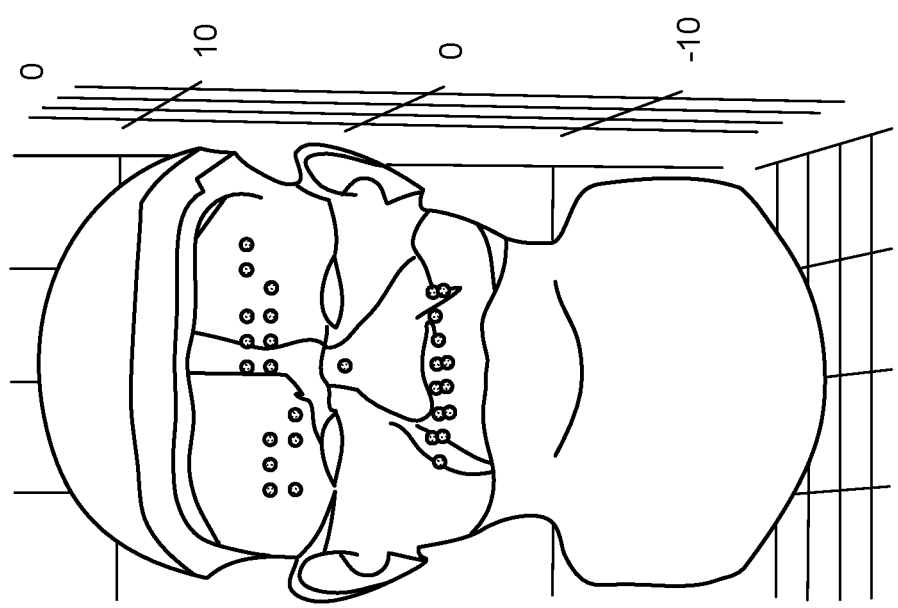

FIG. 6 illustrates some example locations on a face of a user that may be tracked, according to some embodiments. Specifically, FIG. 6 shows an embodiment in which the headset is tracking locations at the right and left brow, and an upper lip area of the user. These areas of the face, including around the nose and eyes, as well as the jawline and upper lip and lower face in general are challenging for some cameras which do not provide detailed depth information and are less detailed in wider, lateral angles. In contrast, using the transducers to track these areas provides greater resolution for depth information as well as allowing more frames of information to be captured over a period of time compared to a camera. The transducers uses less power and can sample more frequently. Further, the transducers can track the motion of the face through facial hair because the ultrasound used penetrates the facial hair and reflects back from the skin. As such, the transducers track motions that are obscured by cameras for some users. In some embodiments, the transducers tracks the facial expressions without any further tracking. In other embodiments, the headset fuses the data gathered from the transducers, with camera information, and even voice to capture to maximize the data capture. By selecting positions for transducers that maximize the received signal amplitude for a given expression, the positioning of the transducers may be optimized for tracking a given expression.

Figure 7:
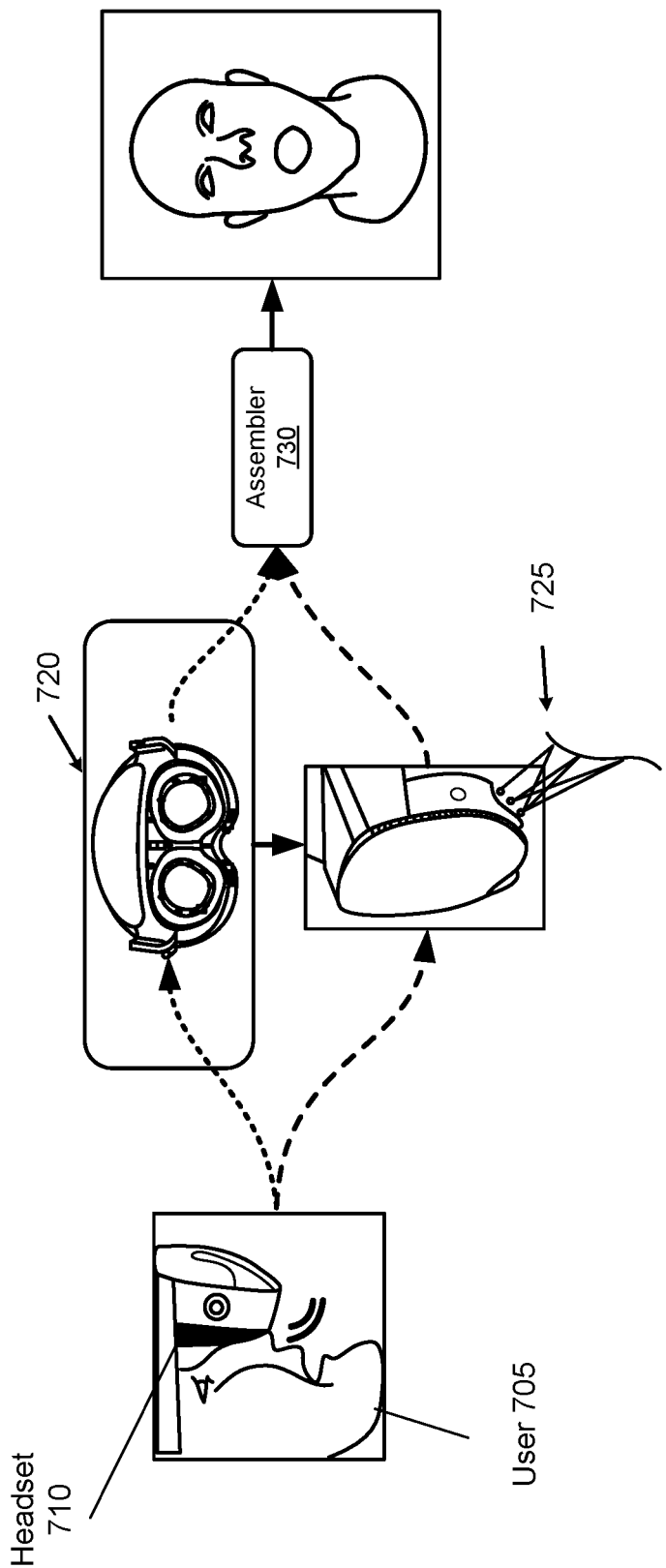
FIG. 7 is a diagram of the process of fusing the data from the transducers with the data captured by camera to assemble a map of the user's facial expressions, according to some embodiments.

FIG. 7 is a diagram of the process of fusing the data from the transducers with the data captured by camera to assemble a map of the user's facial expressions, according to some embodiments. The process shown in FIG. 7 may be performed by components of an audio system (e.g., face tracking system 390). Other entities may perform some or all of the steps in FIG. 7 in other embodiments. Embodiments may include different and/or additional steps, or perform the steps in different orders.

The user 705 wears a headset 710. The headset 710 includes camera tracking using the DCA 345 as well as face tracking using the face tracking system 390. The camera-based system 720 generates a version of the facial expression capture based solely on the captured images. The transducer-based system 725 does its own facial expression capture using the face tracking system 390. Assembler 730 fuses these two systems together to form a fused representation based on both sets of data. For example, cameras can be used to detect facial expressions in one part of the face, e.g., eyes, while ultrasonic transducers can be used to detect facial expressions in another portion of the face, e.g., lower face and mouth. In another example, both cameras and ultrasonic transducers can be receiving data from the same region such that ultrasonic transducers provide depth information while cameras provide information about lateral movement.

Figure 8:
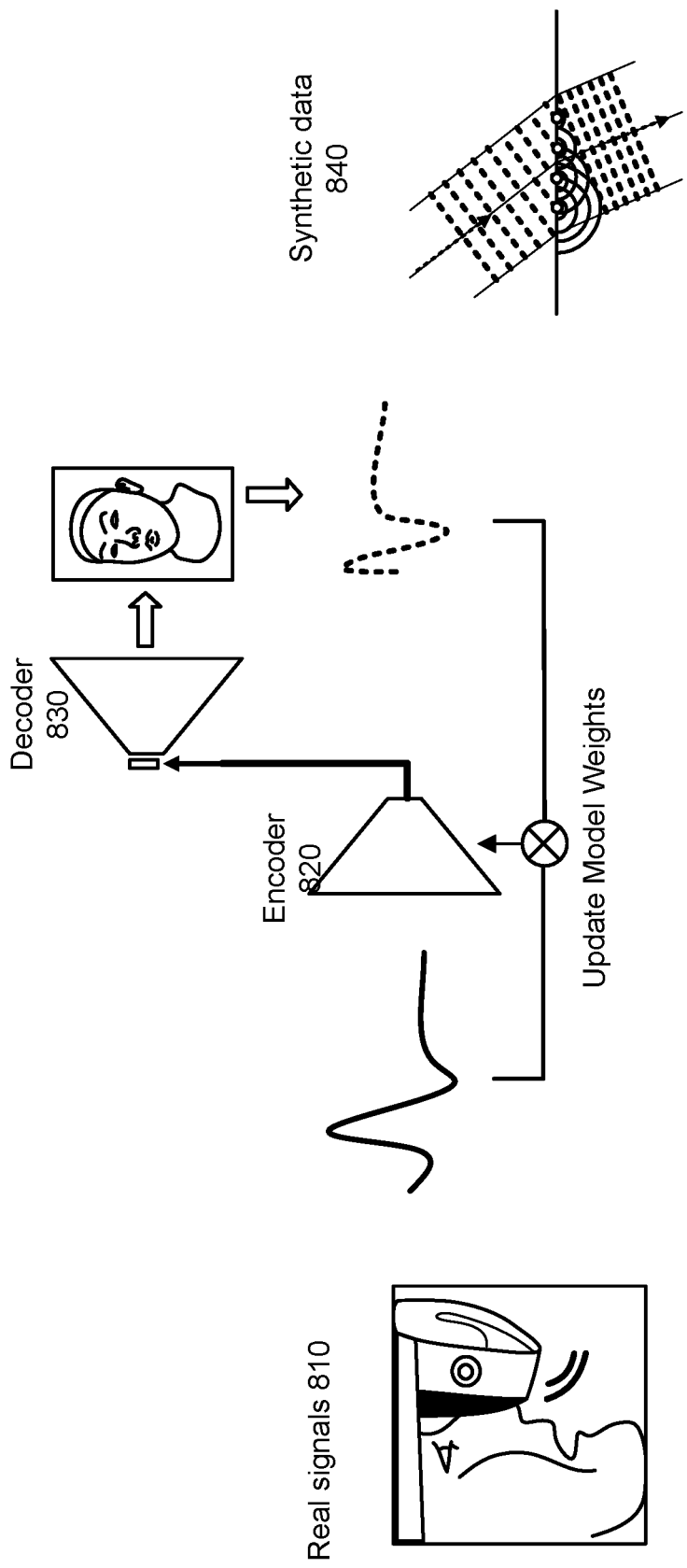
FIG. 8 is a diagram of the process of synthetic data generation, according to some embodiments.

FIG. 8 is a diagram of the process of synthetic data generation, according to some embodiments. The process shown in FIG. 8 may be performed by components of an audio system and console (e.g., the face tracking system 390 and the console 315). Other entities may perform some or all of the steps in FIG. 8 in other embodiments. Embodiments may include different and/or additional steps, or perform the steps in different orders.

Real signals 810 are tracked from a headset and user and provided to machine learning models. The encoder 820 receives the real signals 810, updates the model weights in the machine learning models based on the real signals 810. The data captured from a user is used to generate a data-based model of a user which is used for further synthetic data generation—based on the simulation of scenarios using the data model. The decoder 830 generates synthetic data 840. This synthetic data 840 can be used for training the machine learning algorithms responsible for face tracking.

FIG. 9 is a flowchart of process for tracking facial expression using ultrasound and millimeter waves, in accordance with one or more embodiments. The process shown in FIG. 9 may be performed by components of a headset (e.g., headset 200) and/or associated modules (e.g., face tracking system 390).). Other entities may perform some or all of the steps in FIG. 9 in other embodiments. Embodiments may include different and/or additional steps, or perform the steps in different orders.

The face tracking system 390 transmits 910 beams, by a plurality of transducers positioned on a frame of a headset, towards one or more portions of a face of a user of the headset. The headset may be a headset 200. The transducers may be transducers 410 or transducers 510. The portions of the user's face may include the user's lower face, the user's jawline, the user's nose, or the user's eyebrow region. The face tracking system 390 receives 920 reflected beams from the one or more portions of the face at the plurality of transducers. In some embodiments, the reflected beams are received at the same transducers which transmitted 910 the beans. In other embodiments, a separate portion of transducers act as sensors to receive 920 the reflected beam. The face tracking system 390 produces 930, by the plurality of transducers, sensor data that varies in response to the received reflected beams. The face tracking system 390 applies 940, by a controller, the sensor data to a machine learning model that generates, using the sensor data, an estimate of an expression of the user. In some embodiments, the face tracking system 390 generates an avatar associated with the user with the estimated expression. In other embodiments, the estimated expression is captured as user feedback for use by other applications.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A headset comprising:
    a frame;
    a plurality of transducers positioned on the frame to transmit beams towards one or more portions of a face of a user of the headset, and to receive reflected beams from the one or more portions of the face, wherein the plurality of transducers produce sensor data that varies in response to the received reflected beams;
    a controller configured to apply the sensor data to a machine learning model that generates, using the sensor data, an estimate of an expression of the user; and
    a camera positioned to capture images of portions of the face of the user of the headset and wherein the camera provides data with high lateral resolution, wherein the camera captures images at a frame rate that is equal to or slower than a rate at which the plurality of transducers produce the sensor data.

2. The headset of claim 1, wherein the plurality of transducers include at least one of an ultrasonic transducer or a millimeter wave transducer.

3. The headset of claim 1, wherein an avatar associated with the user is updated to have the estimated expression.

4. The headset of claim 1, wherein the controller is further configured to apply the captured images to the machine learning model, and the estimated expression of the user is generated using the captured images.

5. The headset of claim 1, wherein locations of each of the plurality of transducers is distributed on the headset to optimize predicted accuracy.

6. The headset of claim 1, wherein the plurality of transducers can operate in both pulse-echo and pitch-catch modes.

7. The headset of claim 1, wherein each of the plurality of transducers has a range at which it obtains an amplitude measurement, wherein each of the plurality of transducers is directed to an associated portion of the face of the user, and wherein the amplitude measurement obtained to measure movement of the associated portion of the face of the user and the range of each transducer is used to determine the expressions of the user.

8. The headset of claim 1, wherein the one or more portions of the face comprise at least one of: lower face, jawline, nose, or eyebrow region.

9. The headset of claim 1, wherein the machine learning model further generates an estimate of a head movement of the user by sensing relative head pose with respect to a body part of the user, wherein the body part of the user includes shoulders or upper torso.

10. The headset of claim 1, wherein the headset is a pair of smart glasses.

11. The headset of claim 10, wherein the smart glasses have an eyeglasses-shaped form factor.

12. A method comprising:
    transmitting beams, by a plurality of transducers positioned on a frame of a headset, towards one or more portions of a face of a user of the headset;
    receiving reflected beams from the one or more portions of the face at the plurality of transducers;
    producing, by the plurality of transducers, sensor data that varies in response to the received reflected beams;
    applying, by a controller, the sensor data to a machine learning model that generates, using the sensor data, an estimate of an expression of the user;
    capturing, by a camera of the headset positioned to capture images of portions of the face of the user of the headset, images of portions of the face of the user at a frame rate that is equal to or slower than a rate at which the plurality of transducers produce the sensor data, wherein the camera provides data with high lateral resolution.

13. The method of claim 12, further comprising generating an avatar associated with the user with the estimated expression.

14. The method of claim 12, further comprising applying the captured images from the camera to the machine learning model to estimate the expression of the user.

15. The method of claim 12, wherein locations of each of the plurality of transducers is distributed on the headset to optimize predicted accuracy by positioning transducers such that received signal amplitude is maximized for a given expression.

16. The method of claim 12, wherein the plurality of transducers can operate in both pulse-echo and pitch-catch modes.

17. The method of claim 12, wherein each of the plurality of transducers has a range at which it obtains an amplitude measurement, wherein each of the plurality of transducers is directed to an associated portion of the face of the user, and wherein the amplitude measurement obtained to measure movement of the associated portion of the face of the user and the range of each transducer is used to determine the expressions of the user.

18. The method of claim 12, wherein the one or more portions of the face comprise at least one of: lower face, jawline, nose, or eyebrow region.

19. The method of claim 12, wherein the machine learning model further generates an estimate of a head movement of the user by sensing relative head pose with respect to a body part of the user, wherein the body part of the user includes shoulders or upper torso.

20. A computer program product comprising a non-transitory computer-readable storage medium containing instructions stored thereon that, in response to execution by one or more processing devices of a headset, cause to the headset to:
   transmit beams, by a plurality of transducers positioned on a frame of the headset, towards one or more portions of a face of a user of the headset;
   receive reflected beams from the one or more portions of the face; and
   produce sensor data that varies in response to the received reflected beams;
   cause a controller to apply the sensor data to a machine learning model that generates, using the sensor data, an estimate of an expression of the user; and
   capture, by a camera positioned to capture images of portions of the face of the user of the headset, images at a frame rate that is equal to or slower than a rate at which the plurality of transducers produce the sensor data and wherein the camera provides data with high lateral resolution.

* * * * *